United States Patent
Zeng et al.

(10) Patent No.: US 8,218,269 B2
(45) Date of Patent: Jul. 10, 2012

(54) GIMBAL MOUNTED SLIDER ASSEMBLY WITH RAMP LIMITER TRANSVERSE BAR

(75) Inventors: Qinghua Zeng, Fremont, CA (US); Chao-Hui Yang, Milpitas, CA (US); Yen Fu, San Jose, CA (US); Ellis Cha, San Ramon, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 0 days.

(21) Appl. No.: 13/136,914

(22) Filed: Aug. 15, 2011

(65) Prior Publication Data

US 2011/0299196 A1    Dec. 8, 2011

Related U.S. Application Data

(62) Division of application No. 12/660,901, filed on Mar. 5, 2010, now Pat. No. 8,000,061, which is a division of application No. 11/497,161, filed on Aug. 1, 2006, now Pat. No. 7,684,154.

(51) Int. Cl.
*G11B 5/54* (2006.01)
*G11B 21/22* (2006.01)

(52) U.S. Cl. .......... 360/255; 360/234.5; 360/245.3; 360/245.9

(58) Field of Classification Search .......... 360/234.5, 360/235.3, 240, 245.3, 245.5, 245.6, 245.8, 360/245.9, 254.7, 255

See application file for complete search history.

(56) References Cited

U.S. PATENT DOCUMENTS

| 6,226,154 B1 | 5/2001 | Albrecht |
| 6,667,856 B2 | 12/2003 | Danielson et al. |
| 6,965,501 B1 | 11/2005 | Pan et al. |
| 2006/0262456 A1* | 11/2006 | Wang et al. ............... 360/245.3 |

* cited by examiner

*Primary Examiner* — Craig A. Renner
*Assistant Examiner* — Gustavo Polo
(74) *Attorney, Agent, or Firm* — Saile Ackerman LLC; Stephen B. Ackerman (57) ABSTRACT

Gimbal designs are provided that minimize adverse dynamic performance of a HDD suspension, particularly subsequent to head-disk-interface (HDI) interactions. The improvement of operational performance can be seen in graphical representations of the vibrational modes of a gimbal mounted slider subsequent to such HDI interactions. Each gimbal design includes a ramp limiter formed as two separated arms connected by one or two transverse bars and a routing of conducting traces that relieves stress and minimally contacts these bars.

6 Claims, 7 Drawing Sheets

FIG. 6c

GIMBAL MOUNTED SLIDER ASSEMBLY WITH RAMP LIMITER TRANSVERSE BAR

This is a Divisional Application of U.S. patent application Ser. No. 12/660,901, filed on Mar. 5, 2010 now U.S. Pat. No. 8,000,061, which is itself a Divisional Application of U.S. patent application Ser. No. 11/497,161 filed on Aug. 1, 2006, now issued as U.S. Pat. No. 7,684,154, which is herein incorporated by reference in its entirety and assigned to a common assignee.

BACKGROUND OF THE INVENTION

1. Field of the Invention

This invention relates to the design of a hard disk drive (HDD) suspension to support a slider mounted read/write transducer. More particularly, it relates to the design of a gimbal that provides superior dynamic performance during drive operation.

2. Description of the Related Art

A hard disk drive (HDD) uses an encapsulated thin film magnetic read/write head (transducer), called a slider, to read and write data on a magnetic medium or storage disk. The slider has a pre-patterned air-bearing surface (ABS) and is mounted on a flexible head gimbal assembly (HGA) that is itself mounted on a loadbeam. The combination of the loadbeam, the gimbal assembly (also referred to as a flexure), electrically conducting leads (or traces) that are routed along the gimbal and connect the slider to external circuitry (typically a pre-amplifier), a hinge mechanism and a baseplate, is collectively termed the suspension. The suspension is activated by a servo actuator and associated electronic control circuitry to position the slider at various target locations along the magnetically encoded tracks on the disk. As the disk is rapidly rotated by a spindle motor, hydrodynamic pressure causes an air flow between the ABS of the slider and the surface of the disk. This flow, called the air-bearing layer, lifts and suspends the slider so that it literally flies above the surface of the disk (at a "fly height" of approximately 10 nm) on a layer of air called, appropriately, the air-bearing layer. The edge of the slider into which the disk rotates is called its "leading edge," the opposite edge, which contains the read/write head is called the "trailing edge." The loadbeam, as is known in the art, has a small protrusion or "dimple" formed on its disk-facing side that presses against the backside of the slider, providing a downward force and a pivot point for the slider to rotate about. This suspension system of loadbeam and gimbal provides mechanical support for the slider while also allowing the slider pitch and roll capability when fly height is achieved. In addition, the system provides an electrical connection (i.e., a placement for the routing of conducting traces) between solder connections on the slider (connecting to the read/write head) and the pre-amplifier.

Enabling the slider to fly in a stable manner above the disk places stringent requirements on the suspension design, such as providing a proper range of its vertical stiffness (Kz), gimbal pitch and roll stiffness (Kp, Kr), gimbal pitch/roll static attitude (PSA/RSA), operational shock performance (G/gram) and the like. These requirements are mainly static and based on system geometry. A further requirement is that the suspension have little or no dynamic effect on the air bearing performance of the slider when the drive is operational. This requirement is related to the dynamic performance of the suspension.

In general, dynamic performance requirements are not always enforced, so the dynamic performance of many existing suspensions is not good. The role of the gimbal design in improving suspension dynamic performance merits study. In this regard, there are elements of the gimbal structure that are meant to provide improved static performance of the suspension system, but their design can have an adverse impact on the dynamic performance of the suspension. For example, the structure of the gimbal includes a ramp limiter that is meant to protect the slider from shocks when the drive is not operating and the slider is "parked", but it is found that the design of the limiter has an effect of the manner in which the slider rides on its air bearing layer. In addition, the gimbal is designed with a view to accommodating the electrically conducting traces that connect the solder ball bonding (SBB) terminals of the read/write transducer to the external circuitry of the HDD. It is discovered, however, that the manner in which the traces are laid out and the route along which they are laid out also affects the dynamic performance of the suspension.

Figure 1:
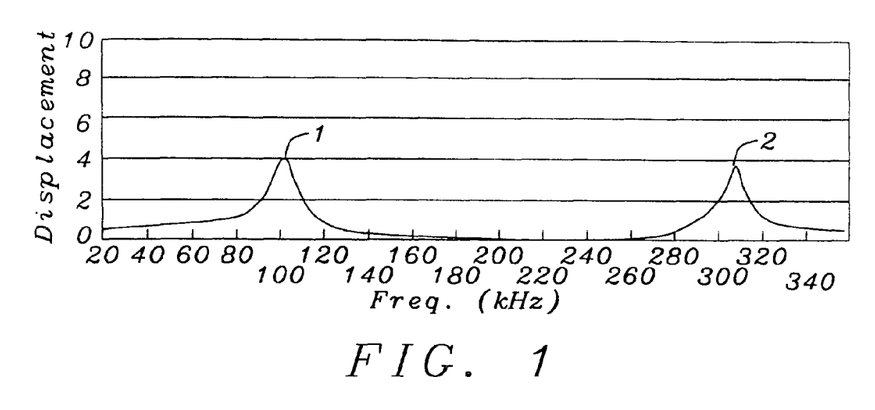
FIG. 1 is a schematic graphical representation of the vibrational response of a slider after an HDI interaction, there being no dynamical coupling between the slider, a gimbal and a loadbeam.
Figure 2:
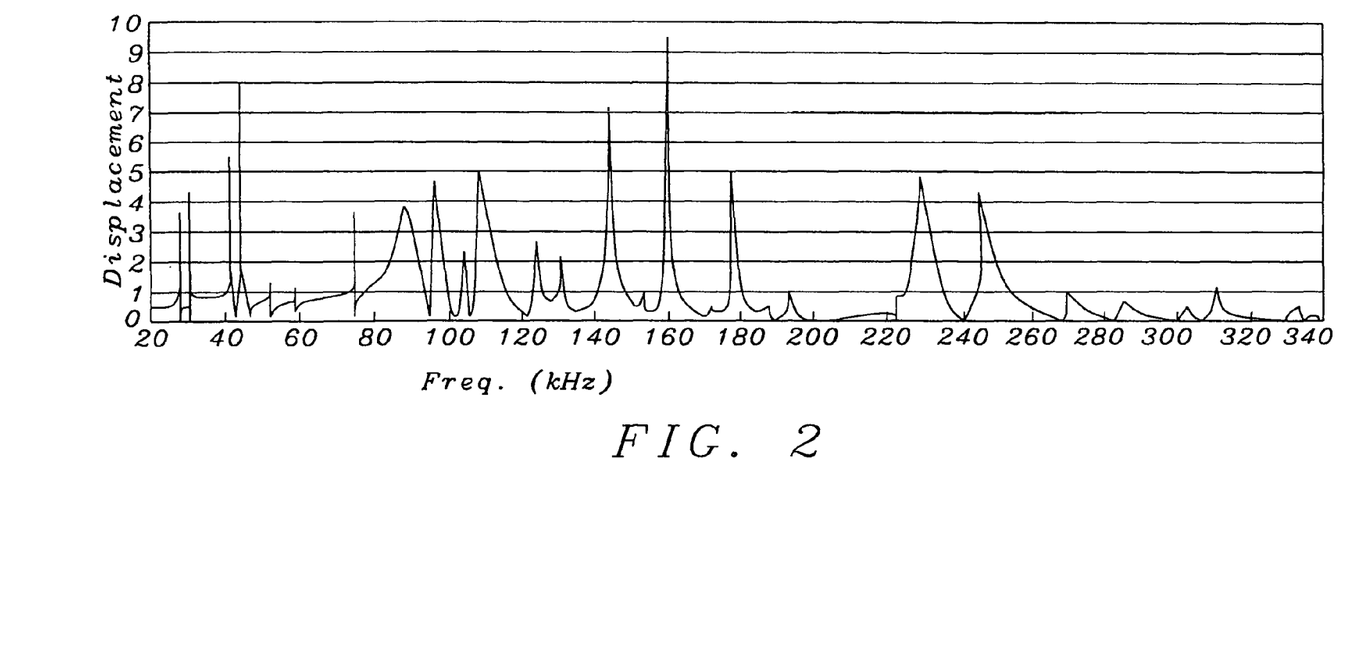
FIG. 2 is a schematic graphical representation of the vibrational response of a slider, similar to that of FIG. 1a, now mounted on a gimbal and a loadbeam.

FIG. 1 and FIG. 2 shows the effect of suspension dynamics on the vibrational modes of a slider. FIG. 1 is a graphical representation of the vibrational modes of a slider that is mounted on a massless suspension, subsequent to a head-disk interface (HDI) interaction, where the slider strikes a surface asperity (a bump) on a rotating disk or where the slider is affected by lubricant on the disk surface. As can be seen, the interaction produces two damped vibrational modes, at approximately 105 kHz (1) and 315 kHz (2). The damping is inferred from the gentle rise and fall of the curves as well as their width.

FIG. 2 shows what is essentially the same slider, now mounted on a normal suspension, undergoing a similar HDI interaction. As can be seen, there is now a plurality of vibrational modes that are excited and, from their sharpness and height, it is clear that they are poorly damped. Those modes at low frequencies (eg. between 20 and 100 kHz) that are not well damped make it difficult for the slider to relax to an equilibrium condition. They can even cause the air bearing condition to become unstable and generate a sustained vibration of the slider. Under such circumstances the disk drive will fail or, at the least, its performance will be seriously degraded.

FIG. 3a to FIG. 3d show, schematically, four exemplary prior art gimbal designs illustrated as viewed from different perspectives so that important design features can be seen. FIG. 3e-FIG. 3f are typical vibrational response curves of sliders that are mounted on any one of such prior art gimbals.

Figure 3A:
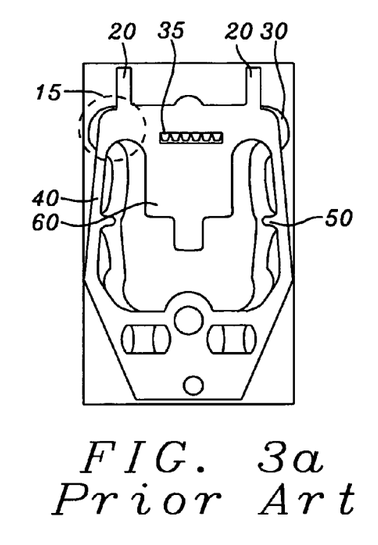
FIG. 3a-FIG. 3d are schematic illustrations of prior art gimbal designs.
Figure 3B:
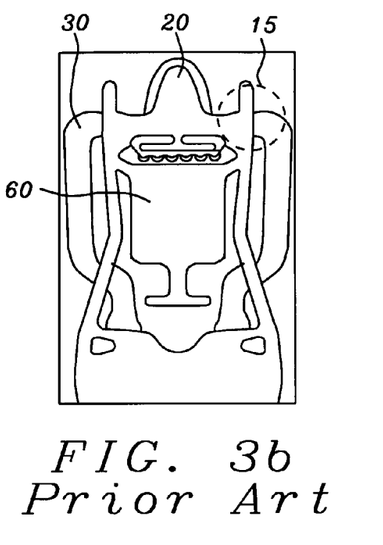
Figure 3C:
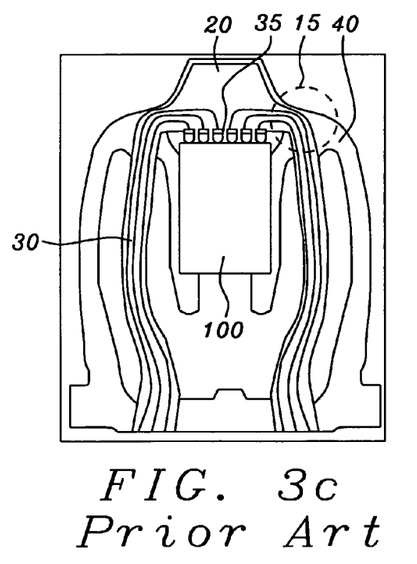
Figure 3D:
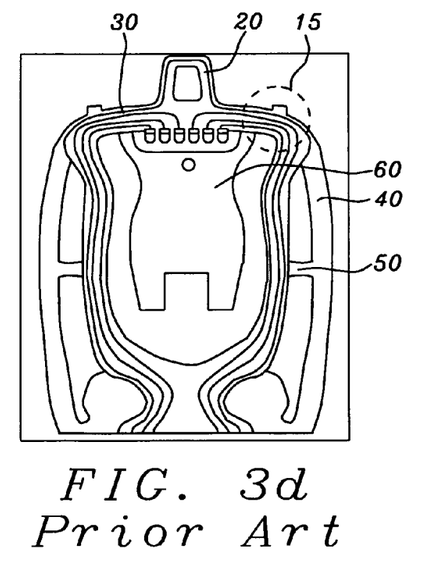
Figure 3E:
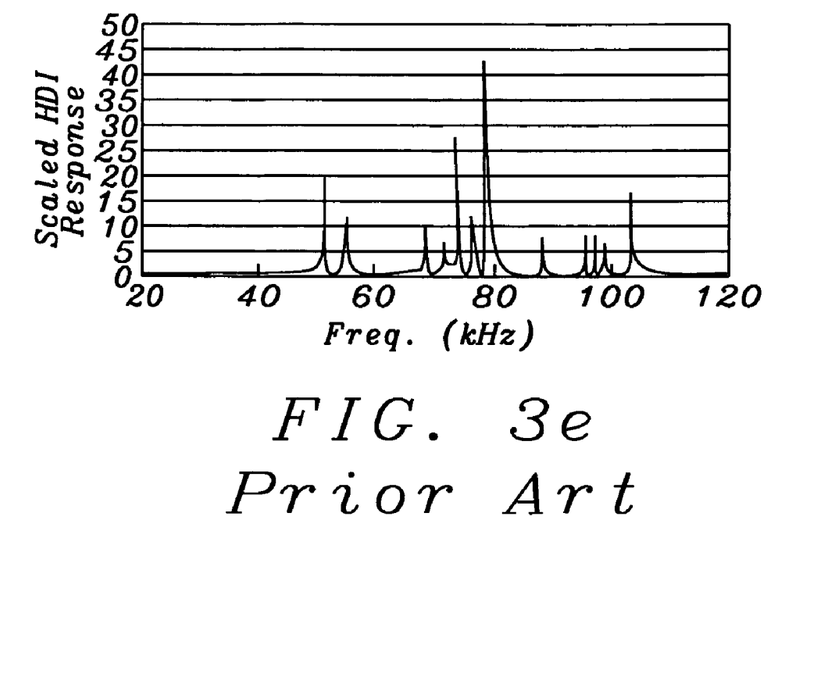
FIG. 3e-FIG. 3f are schematic graphical representations of the vibrational response of a slider mounted on prior art gimbals of the type illustrated in FIG. 3a-FIG. 3d.
Figure 3F:
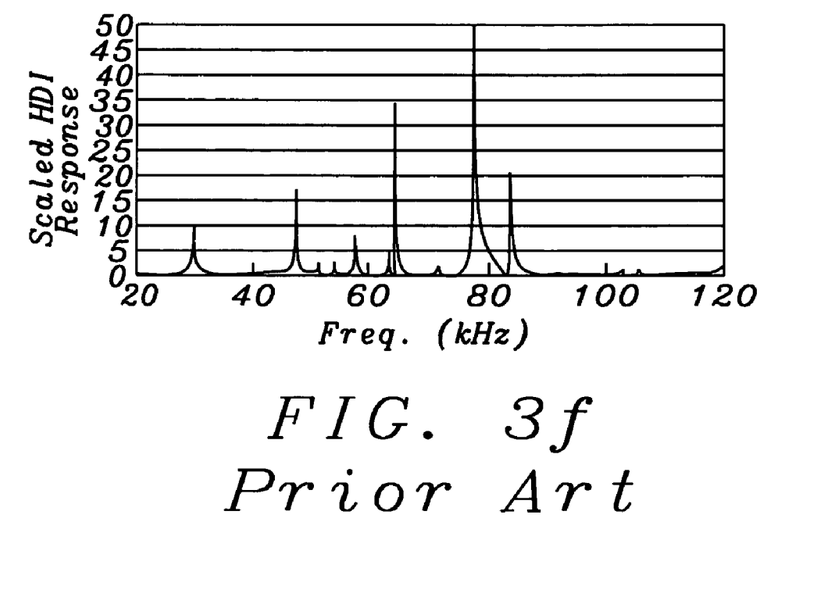

FIG. 3a and FIG. 3b are shown from an overhead perspective (looking downward towards the disk surface), so the slider (not shown) would be mounted on the mounting pad (60), on the underside of the gimbal. FIG. 3c and FIG. 3d are shown from a perspective looking upward from the disk surface, so the slider (100) can be seen in FIG. 3c and the underside of a slider mounting pad (60), without a mounted slider (for clarity), can be seen in FIG. 3d. Symmetrically placed electrical traces (30) are shown in each figure with various routings from the distal end of the gimbal (top of figure) to the proximal end (bottom of figure). It is to be noted that the routing of the traces is such that the traces overlap with and are in contact with substantial portions of the stainless steel structure of the gimbal itself. This is particularly true in the encircled area (15) indicated in each of FIG. 3a-FIG. 3d.

Looking more closely at FIG. 3a, there is seen the slider mounting pad (60) from an overhead view. Extending distally from the pad there are seen two arms (20) that comprise the ramp limiter for this design (note that the ramp limiter need not be formed in two pieces as in this design). A pair of stiffened traces (30) can be seen extending along the lateral sides of the gimbal. The encircled area (15) indicates where the traces extend laterally outward to reach the gimbal outriggers (40), which are the flexing portions of the gimbal, and, in doing so, the traces overlap substantial portions of the gimbal structure. In this region they are, therefore, in substantial contact with the stainless steel structure of the gimbal, although the traces are insulated from any electrical contact with the gimbal.

Although the traces are insulated and stiffened by an overlay of stainless steel (not shown), they are supported by tabs (50) that extend inward from the gimbal outriggers (40). An opening in the mounting pad exposes the terminal ends (35) of the traces at the position where they would be connected to the slider's solder bonding balls (SBB).

FIG. 3b shows a similar gimbal design wherein the traces (30) now extend laterally outside the outriggers (40). Once again, the encircled region (15) indicates where the traces are in substantial contact with the gimbal structure.

FIG. 3c shows the underside of a gimbal design (with a slider mounted thereon) in which the ramp limiter (20) is not formed in two separated pieces. Like the design of FIG. 3a, the traces (30) are routed over a substantial portion of the gimbal (15) then pass inside of the gimbal outriggers (40) and are not supported by tabs because they are stiffened. The terminal ends (35) of the traces are shown connected to solder ball (SBB) terminals on a slider (100).

FIG. 3d is another underside view of a gimbal design (with no mounted slider) that, like the design of FIG. 3c has a single ramp limiter (20). The traces (30) are supported by tabs (50) extending inward from the outriggers (40). As in the previous figures, the encircled region (15) shows the substantial contact between the traces and the gimbal.

Typical low frequency vibrational slider modes excited when sliders mounted on the gimbals of FIGS. 3a-3d engage in HDI interactions are shown in FIG. 3e-FIG. 3f. As is clearly shown, the modes are narrow and sharp, indicating very little damping, and the fact that they are at low frequencies (below 100 kHz) is evidence that more damaging effects may occur.

Gimbal design has received some attention in the prior art. Pan et al. (U.S. Pat. No. 6,965,501) discloses a gimbal design with a limiter that has a single arm. The design of the limiter allows easier bonding of the traces to the slider, it uses less insulation and it permits the loadbeam to have a narrower tip. The gimbal design does not address problems of suspension dynamics, however.

Danielson et. al (U.S. Pat. No. 6,667,856) discloses a gimbal design with an additional shock absorbing mechanism. This mechanism is meant to absorb shocks from excessive gimbal excursions due to encounters between the slider and the disk. It is not a mechanism that is meant to prevent such shocks from occurring.

Albrecht (U.S. Pat. No. 6,226,154) discloses a gimbal for a load/unload ramp having an improved system for parking the sliders. This design does not address the problem of gimbal dynamics during operation of the HDD.

It is clear from a reading of the prior art cited above that there is a need to improve slider response to vibrational motion produced by head-disk interface (HDI) interaction of a loadbeam mounted slider with disk asperities (i.e., bumps, lubricant on the disk and other deviations from disk planarity) while the disk is in rotational motion.

SUMMARY OF THE INVENTION

The first object of the present invention is to provide a gimbal design for a slider mounted read/write transducer (referred to hereinafter as a slider) that optimizes the suspension's dynamic response, or, in other words, minimizes adverse contributions of the suspension, to slider motion over an air bearing layer.

The second object of the present invention is to provide a gimbal design for a slider that has minimal adverse effects on the dynamic response of a suspension to HDI events.

The third object of the present invention is to provide such a dynamically optimized gimbal design that does not degrade already acceptable static slider properties such as stiffness in response to pitch, roll and radial motion.

The fourth object of the present invention is to provide such a dynamically optimized gimbal design that makes use of and even improves upon such existing gimbal design features as the shape of the ramp limiter, the routing of traces, the stresses on solder ball connections to slider terminals and the heat dissipation properties of the gimbal during the solder ball melting process.

These objects will be met by a set of gimbal designs that include several common features:

1) separation of the ramp limiter into two parallel, distally directed segments, of substantially trapezoidal shape;

2) linkage of the limiter segments by one or two transverse connecting bars;

3) appropriate routing and support of the traces relative to the connecting bars and the solder ball connections, the routing minimizing overlap of the traces with the stainless steel structure of the gimbal and the routing being of sufficient length so as to minimize stresses in the traces and on the solder connections to the slider.

The gimbal designs that incorporate these features have been shown to produce the dynamic performance of the suspension that meets the objects of the invention.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein:

FIG. 6b is a schematic view of the bottom side of the gimbal of FIG. 6a.

FIG. 6c is a schematic graphical representation of the vibrational response of a slider mounted on the gimbal of FIG. 6a.

DESCRIPTION OF THE PREFERRED EMBODIMENTS

Each preferred embodiment of the present invention is a gimbal design that produces improved/optimized dynamic response of a slider mounted thereon (and with the gimbal being a part of a suspension) as compared to the slider response when mounted on a prior art gimbal/suspension. Such improved dynamic response can be observed, for example, in the shape and frequency dependence of the vibrational modes of the gimbal mounted slider subsequent to a HDI interaction between the slider and a disk surface asperity and/or lubricant on a rotating disk. It might, in fact, be more correct to say that the design of a gimbal should be to minimize adverse effects on the dynamics of the suspension and that such a minimization can be equated to an improvement of suspension dynamics. It is precisely these effects that the embodiments of the present invention will produce. It is noted that within the context of the following description, "distal" refers to the slider end of the gimbal, "proximal" refers to the baseplate mounted end of the suspension," "transverse" refers to the direction, in the plane of the gimbal, that is perpendicular to the lengthwise (i.e. the proximal to distal) direction of the gimbal.

Figure 4A:
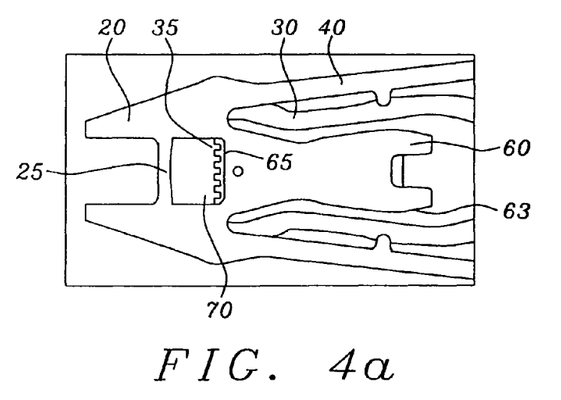
FIG. 4a-FIG. 4b are schematic views of the top and bottom sides of a gimbal that represents a first of the embodiments of the present invention.

Referring now to FIG. 4a, there is seen, schematically, the distal region of a top side (looking down towards the disk surface) of a gimbal designed to meet the objects of the present invention. The ramp limiter is divided into two distally extended arms (20) (i.e., cantilevered distally outward from the body of the gimbal) that are separated, are of substantially trapezoidal shape and are connected by a transverse bar (25), typically formed of stainless steel positioned approximately at the midpoint (in the longitudinal direction) along the bars. A slider mounting pad (60) extends proximally (rearward) from the limiter and its distal edge (65) is separated from the transverse bar (25) by a space (70). The solder connecting terminals (35) attaching the traces to the slider can be seen through the space (70). These terminals will be soldered to solder balls on the distal edge of the slider. Preferably, the gimbal as well as the transverse connecting bar are made of stainless steel Referring to FIG. 4b, there is shown a bottom view (looking up from disk) of the gimbal in FIG. 4a. There can be seen a slider (100) mounted on the mounting pad (60). A layer of insulation (not shown) is formed between the slider and the pad to prevent electrical contact between the slider and the pad. Electrical traces (insulated) (30) are attached by solder ball connections (35) to the distal edge of the slider (100) and the traces are routed transversely outward, with maximal length, to contact the outriggers at (45) and then directed proximally (rearward) along a space separating the outriggers (40) from the lateral edges of the mounting pad, but transversely inward from the outriggers and substantially between the lateral edges of the mounting pad and the outriggers. The traces are supported by a pair of trace-support tabs (50), one of which extends inward from each of the outriggers. It is noted that the traces only minimally overlap the connecting bar (25) between the limiter arms and are lengthened to properly pass over the tabs (50). The traces are routed over the space between the connecting bar (70) and have minimal contact and overlap with the actual metallic structure of the gimbal. The full transverse extension, with maximal length, of the traces to contact the outrigger at (45) insures a strong and stress-free connection between the traces and the connections to the slider.

Figure 4B:
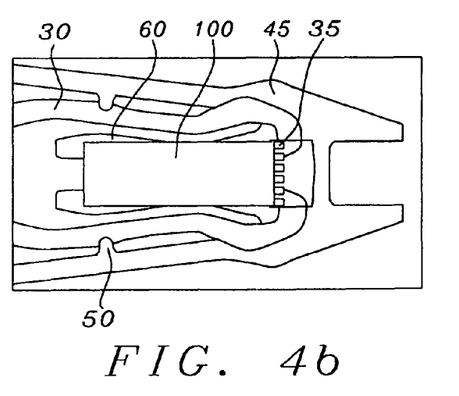
Figure 4C:
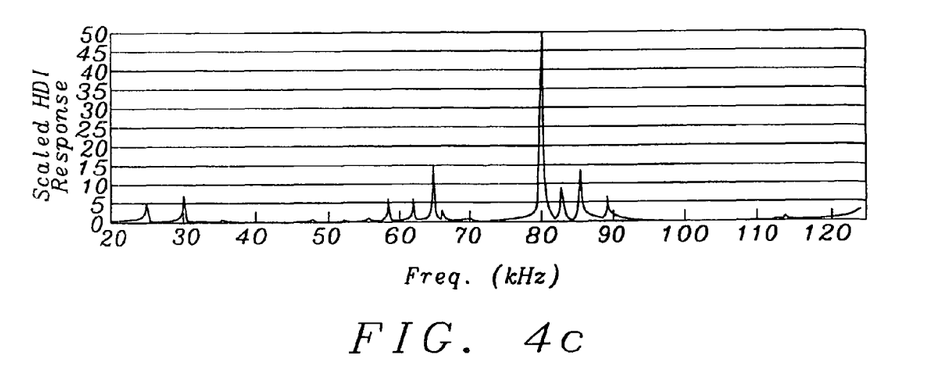
FIG. 4c is a schematic graphical representation of the vibrational response of a slider mounted on the gimbal of FIG. 4a-FIG. 4b.

Referring to FIG. 4c, there is shown a schematic graphical representation of the vibrational response of the gimbal mounted slider of FIG. 4a and FIG. 4b, subsequent to an HDI interaction. Comparing FIG. 4c with either FIG. 3e or 3f, it can be seen that vibrational modes have been eliminated or reduced in height. It is also noted that the mode of routing of the traces from the solder ball connections (35) outward to the outriggers (40), including the minimal contact and overlap between the traces and the gimbal structure, has minimal adverse effect on either the actual solder ball bonding process or on the static PSA/RSA performance of the gimbal. In addition, there is the clear positive benefit of minimal stress on the solder connections and on the transverse bar (25) during non-operational shocks to the gimbal. The minimization of stress in the traces provides an increased margin of safety in the operation of the suspension.

Figure 5A:
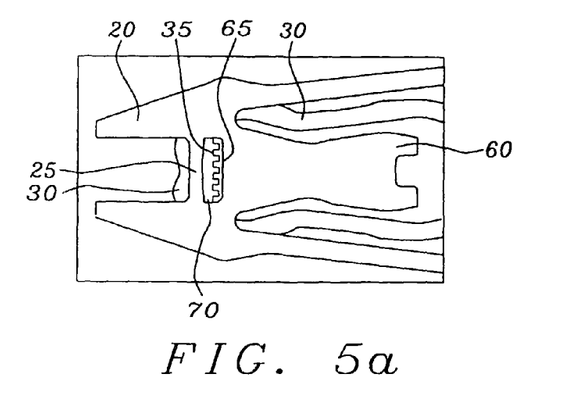
FIG. 5a-FIG. 5b are schematic views of the top and bottom sides of a gimbal that represents a second of the embodiments of the present invention.
Figure 5B:
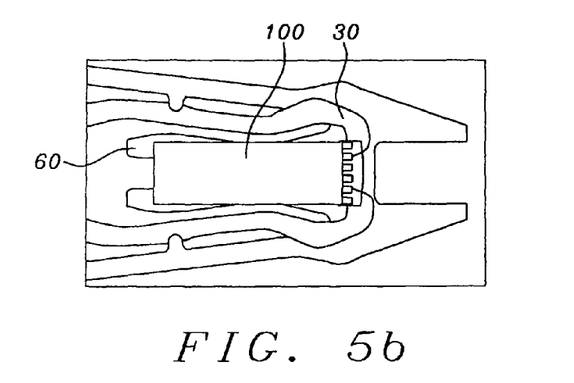

Referring next to FIG. 5a and FIG. 5b, there is shown schematic representations of another embodiment of the present invention. In FIG. 5a, there is shown an overhead schematic view of the gimbal (looking down towards the disk) showing a ramp limiter formed as two distally extending (cantilevered outward from the gimbal) and separated arms (20) of substantially trapezoidal shape. A transverse bar (25) connects the two arms and is formed adjacent to the distal edge (65) of the slider mounting pad (60), but not in contact with it and, thereby, the bar is very close to the connections between the terminal ends of the traces and the solder ball terminals (35) of the slider. In particular, the space (70) between the bar (25) and the distal edge (65) of the slider pad in this embodiment is narrower than the space (70) shown in FIG. 4a and FIG. 4b.

Referring to FIG. 5b, there is shown, schematically, the gimbal of FIG. 5a as seen when looking upward from a disk surface. The slider (100) is shown mounted on the slider mounting pad (60) and electrical traces are shown routed in a similar manner to the traces in FIG. 4b and as described above so that there is maximal transverse length of the traces and minimal contact and overlap with the transverse bar. However, because of the closeness of the connecting bar to the distal surface of the slider, a minimal portion of the traces (30) passes distally over the connecting bar before being routed proximally rearward and parallel to the outriggers. Preferably, the gimbal as well as the transverse connecting bar are made of stainless steel. Like the description of FIG. 4b, the transverse routing of the traces to contact the outrigger relieves stress in the traces and creates a strong connection to the slider.

Figure 5C:
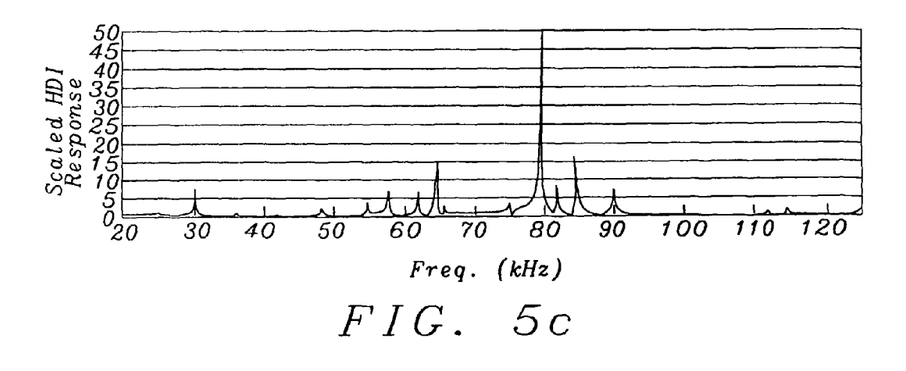
FIG. 5c is a schematic graphical representation of the vibrational response of a slider mounted on the gimbal of FIG. 5a-FIG. 5b.

Referring to FIG. 5c, there is shown a schematic graphical representation of the vibrational response of a slider mounted on the gimbal of FIG. 5a, subsequent to a HDI interaction. The graph is quite similar to the graph of FIG. 4c and, again, indicates superior performance to gimbals of the prior art as shown in FIG. 3e-FIG. 3f. Like the gimbal of FIGS. 4a and 4b, the gimbal embodiment of FIG. 5a also displays excellent properties during non-operational shocks. In addition, because of the length and routing of the traces, the solder ball bonding of the traces to the slider exhibits excellent strength and a margin of safety due to the lower stress in the traces. In addition, the shape of the gimbal and the positioning of the transverse bar (25) close to the solder ball connections provides better thermal protection (the bar providing a heat sink for dissipation of heat during solder ball melting) to the slider and the layers of insulation on which it is mounted during the melting of the solder balls.

Figure 6A:
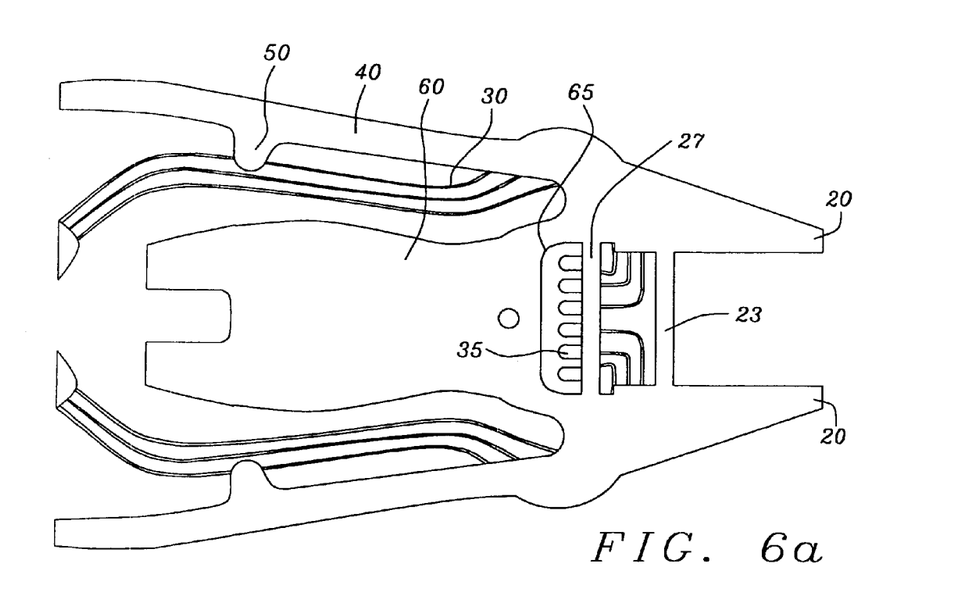
FIG. 6a is a schematic view of the top side of a gimbal that represents a third of the embodiments of the present invention.

Referring now to FIG. 6a, there is shown a schematic overhead view of the top side of another embodiment of the invention which differs from the first two embodiments in that there are two transverse bars (23) and (27), typically formed of stainless steel, connecting the distally extending and separated trapezoidally shaped arms (20) of the ramp limiter. One of the transverse bars (27) is very close to the distal edge (65) of the slider bonding pad, the other transverse bar (23) is distal to bar (27), leaving a space (75) between the two transverse bars and a space (73) between bar (23) and the distal edge (65) of the slider bonding pad.

Figure 6B:
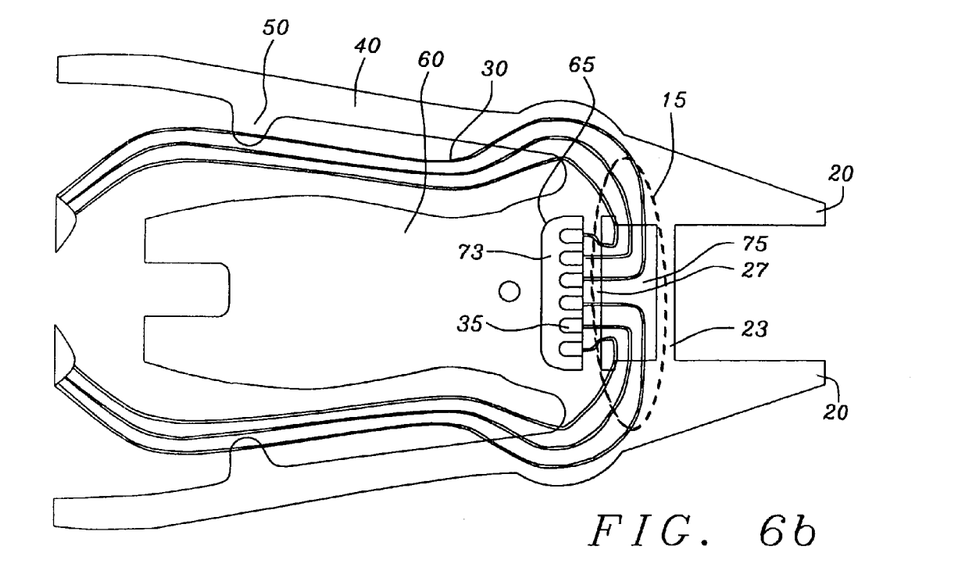

Referring next to FIG. 6b, there is shown the bottom side of the gimbal of FIG. 6a. This figure also indicates clearly a feature of all the embodiments of the invention, namely the routing of the insulated traces with maximal transverse length from the slider connections (35) to the gimbal outriggers (40), so that there is minimal contact with and overlap between the traces and the structure of the gimbal. The elliptical encircled region (15) shows how the traces pass between the two transverse bars (27) and (23), overlapping with bar (27) minimally and with bar (23) not at all. This maximal transverse length of the routing together with minimal contact and overlap between the traces and the metallic structure of the gimbal (eg. the transverse bar or bars) in the region adjacent to the trace/slider connections (35) is a feature of all the embodiments and contributes to the stress-free connections between the traces and the slider and provides a resulting margin of safety during system operation.

As can be seen, the traces are extended transversely towards the outriggers (40) and then routed proximally along the space formed between the inner sides of the outriggers (40) and the lateral edges of the mounting pad (60). The traces are supported by tabs (50) extending inward from the outriggers. Preferably, the gimbal as well as the transverse connecting bars are made of stainless steel. The traces are shown here for clarity as separate conducting leads, but it is understood that these leads will be covered with insulation and there may generally be insulation extending between the leads so that they are substantially encased in an encapsulating insulating covering.

Figure 6C:
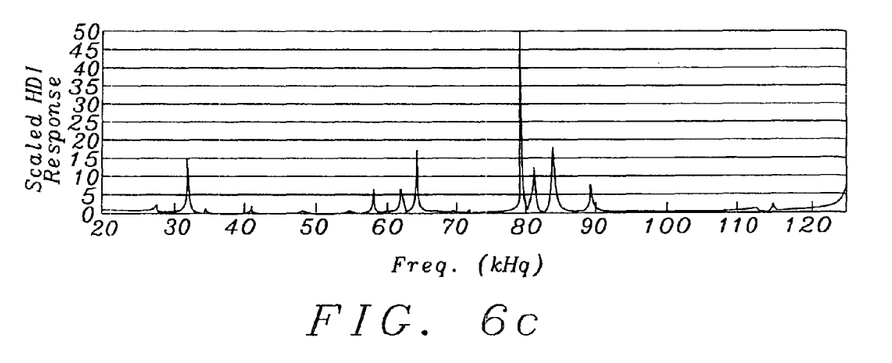

Referring to FIG. 6c, there is shown a schematic graphical display of the vibrational modes of a slider that would be mounted on the gimbal FIG. 6a subsequent to a HDI interaction. Comparing the graph with those of FIG. 3e and FIG. 3f, there can be seen the improvement produced by the gimbal as indicated by the shapes of the vibrational modes. It is further noted that the design of the gimbal provides very good dynamic strength because of the two transverse bars (23) and (27) shown in FIG. 6a. In addition, the extra length of the routing path of the traces (30) insures lowered stress, improved margin of safety and good mechanical strength of the bonding pad connections. There is also very good heat protection of the slider and insulation between the slider and the gimbal during the process of melting the solder balls to produce the final connection between the traces and the slider.

As is understood by a person skilled in the art, the preferred embodiments of the present invention are illustrative of the present invention rather than being limiting of the present invention. Revisions and modifications may be made to methods, processes, materials, structures, and dimensions through which is formed a suspension mounted gimbal having minimal negative impact on the dynamic performance of a slider mounted on the gimbal, while still providing such a gimbal, formed in accord with the present invention as defined by the appended claims.

What is claimed is:

1. A gimbal mounted slider assembly comprising:
a gimbal including a ramp limiter extending distally therefrom and formed as two substantially parallel and separated arms having parallel inner edges and distally tapering outer surfaces;
a transverse bar formed between and connecting said arms, said bar being positioned approximately at a midpoint longitudinally along said arms;
a slider mounting pad having a slider mounted thereon wherein a distal edge of said slider mounting pad is separated from said transverse bar by a space, said slider including solder ball connections formed on a distal surface thereof and said slider mounting pad extending proximally between a pair of separated outrigger elements that form the lateral periphery of said gimbal;
a pair of conducting traces connected to said solder ball connections, each of said pair of conducting traces being routed transversely outward from said connections with a maximal length, while minimally overlapping with said transverse bar, to contact an outrigger and each of said pair of traces thence being routed in a proximal direction along a space between a lateral edge of said mounting pad and an inner edge of an adjacent outrigger; and
a pair of trace support tabs, one tab extending transversely inward from the inner edge of each outrigger element, whereby each trace contacts a tab.

2. The gimbal mounted slider assembly of claim 1 wherein said arms are substantially trapezoidal in shape.

3. The gimbal mounted slider assembly of claim 1 wherein said transverse bar is formed of stainless steel.

4. The gimbal mounted slider assembly of claim 1 wherein said transverse outward routing of each trace away from said solder ball connections and extending to said gimbal outrigger insures a stress-free and mechanically strong connection of said trace to said slider.

5. The gimbal mounted slider assembly of claim 1 wherein said transverse bar provides a heat dissipating mechanism during a process wherein said traces are connected to said solder ball connections.

6. The gimbal mounted slider assembly of claim 1 whereby a head-disk interaction (HDI) between said slider and a disk rotating thereunder is characterized by improved damping of slider vibrational modes.

* * * * *